(12) United States Patent
Buxton et al.

(10) Patent No.: US 8,554,976 B2
(45) Date of Patent: Oct. 8, 2013

(54) SINGLE PIPE NON-BLOCKING ARCHITECTURE

(75) Inventors: Neil Buxton, Reading (GB); Philip David Rose, Islip (GB)

(73) Assignee: PLX Technology, Inc., Sunnyvale, CA (US)

( * ) Notice: Subject to any disclaimer, the term of this patent is extended or adjusted under 35 U.S.C. 154(b) by 177 days.

(21) Appl. No.: 13/179,074

(22) Filed: Jul. 8, 2011

(65) Prior Publication Data

US 2013/0013840 A1    Jan. 10, 2013

(51) Int. Cl.
*G06F 13/36* (2006.01)
*G06F 3/00* (2006.01)
*G06F 13/00* (2006.01)
*G06F 15/16* (2006.01)
*G09G 5/36* (2006.01)

(52) U.S. Cl.
USPC ............. 710/308; 710/52; 710/22; 345/558; 711/111; 711/162; 709/250

(58) Field of Classification Search
USPC ............. 710/308, 52, 22; 345/558; 711/111, 711/162; 709/250
See application file for complete search history.

(56) References Cited

U.S. PATENT DOCUMENTS

| | | | |
|---|---|---|---|
| 5,617,409 A * | 4/1997 | Ozveren et al. | 370/235 |
| 5,737,535 A * | 4/1998 | Bagley et al. | 709/227 |
| 6,141,707 A * | 10/2000 | Halligan et al. | 710/36 |
| 6,678,277 B1 | 1/2004 | Wils et al. | |
| 6,728,795 B1 * | 4/2004 | Farazmandnia et al. | 710/22 |
| 6,756,988 B1 * | 6/2004 | Wang et al. | 345/558 |
| 6,765,867 B2 | 7/2004 | Shanley et al. | |
| 6,829,245 B1 | 12/2004 | Medina et al. | |
| 7,010,638 B2 * | 3/2006 | Deng et al. | 710/306 |
| 7,185,062 B2 | 2/2007 | Lolayekar et al. | |
| 7,228,354 B2 | 6/2007 | Chambliss et al. | |
| 7,376,082 B2 | 5/2008 | Barzilai et al. | |
| 7,404,000 B2 | 7/2008 | Lolayekar et al. | |
| 7,484,058 B2 | 1/2009 | Frey et al. | |
| 7,529,781 B2 | 5/2009 | Frey et al. | |
| 7,558,264 B1 | 7/2009 | Lolayekar et al. | |
| 7,586,850 B2 | 9/2009 | Warren et al. | |
| 7,613,116 B1 | 11/2009 | Medina | |
| 7,616,578 B2 | 11/2009 | Chandrasekaran | |
| 7,617,365 B2 | 11/2009 | Zhang et al. | |
| 7,664,903 B2 | 2/2010 | Belonoznik | |
| 7,668,111 B2 | 2/2010 | Chandrasekaran et al. | |
| 7,707,304 B1 | 4/2010 | Lolayekar et al. | |
| 7,742,412 B1 | 6/2010 | Medina | |
| 7,773,521 B2 | 8/2010 | Zhang et al. | |

(Continued)

*Primary Examiner* — Paul R Myers
*Assistant Examiner* — Christopher A Daley
(74) *Attorney, Agent, or Firm* — Beyer Law Group LLP

(57) ABSTRACT

A method for processing an incoming command destined for a target is provided, comprising: determining if the incoming command is a data command or a management command; forwarding the incoming command to a storage management component of the target when the incoming command is a management command; when the incoming command is a data command: determining if a disk command queue on the target is full; sending the incoming command to the disk command queue when the disk command queue is not full; when the disk command queue is full: starting a timer, the timer having a predetermined length; sending the incoming command to the disk command queue when the disk command queue becomes not full prior to the expiration of the timer; and sending a rejection of the incoming command to the host only if, upon expiration of the timer, if the disk command queue is still full.

20 Claims, 4 Drawing Sheets

(56) References Cited

U.S. PATENT DOCUMENTS

| | | |
|---|---|---|
| 7,864,758 B1 | 1/2011 | Lolayekar et al. |
| 7,962,690 B2 * | 6/2011 | Haustein et al. ............... 711/114 |
| 8,037,213 B2 * | 10/2011 | Archer et al. .................... 710/22 |
| 8,145,806 B2 * | 3/2012 | Lee et al. ......................... 710/39 |
| 8,315,269 B1 * | 11/2012 | Rajamanickam et al. .... 370/419 |
| 2002/0124102 A1 * | 9/2002 | Kramer et al. ................. 709/234 |
| 2003/0093541 A1 | 5/2003 | Lolayekar et al. |
| 2003/0093567 A1 | 5/2003 | Lolayekar et al. |
| 2004/0003087 A1 | 1/2004 | Chambliss et al. |
| 2004/0125806 A1 | 7/2004 | Barzilai et al. |
| 2005/0060481 A1 | 3/2005 | Belonoznik |
| 2005/0246504 A1 | 11/2005 | Frey et al. |
| 2005/0262309 A1 | 11/2005 | Frey et al. |
| 2006/0010299 A1 | 1/2006 | Frey et al. |
| 2006/0036648 A1 | 2/2006 | Frey et al. |
| 2006/0098572 A1 | 5/2006 | Zhang et al. |
| 2006/0227716 A1 | 10/2006 | Chandrasekaran et al. |
| 2006/0227776 A1 | 10/2006 | Chandrasekaran |
| 2006/0248535 A1 | 11/2006 | Grover |
| 2007/0174470 A1 | 7/2007 | Burgess et al. |
| 2009/0073999 A1 * | 3/2009 | Craddock et al. ............. 370/412 |
| 2009/0141628 A1 | 6/2009 | Barzilai et al. |
| 2009/0252037 A1 | 10/2009 | Barzilai et al. |
| 2010/0165841 A9 | 7/2010 | Barzilai et al. |
| 2011/0131346 A1 | 6/2011 | Noeldner et al. |
| 2011/0131351 A1 | 6/2011 | Noeldner et al. |
| 2011/0131357 A1 | 6/2011 | Noeldner et al. |
| 2011/0131360 A1 | 6/2011 | Noeldner et al. |
| 2011/0131374 A1 | 6/2011 | Noeldner et al. |
| 2011/0131375 A1 | 6/2011 | Noeldner et al. |

* cited by examiner

SINGLE PIPE NON-BLOCKING ARCHITECTURE

BACKGROUND OF THE INVENTION

1. Field of the Invention

The present invention relates generally to electronic communication. More specifically, the present invention relates to a solution that provides a non-blocking architecture to a single pipe environment.

2. Description of the Related Art

Universal Serial Bus (USB) protocol is a standard communications protocol for sending signals between devices and host controllers. USB has become the standard mechanism to communicate between computer devices, and is commonly used to link peripherals, such as keyboards, mice, external disk drives, etc. with personal computers. It is also quite commonly used to link various self-sufficient devices, such as cellular phones, portable media devices, etc. with personal computers.

The USB Attached SCSI (UAS) protocol can be used to move data to and from USB storage device by using the USB protocol with a standard Small Computing System Interface (SCSI) command set. SCSI is a set of standards for physically connecting and transferring data between computers and peripheral devices. The SCSI standards define commands, protocols, and device properties.

UAS uses a single pipe through which to transmit both data commands and management commands from a host personal computer to a target device. The data commands, typically reads and writes, operate directly on data stored in the target device. The management commands can involve various aspects of storage management, such as aborting outstanding requests from a queue.

FIG. 1 is a diagram illustrating a standard UAS architecture. As can be seen, a single pipe 100 is used between the UAS driver host 102 and the storage controller and target device 104. The target device may use a storage controller and disk command queue 106 to receive the commands from the UAS driver host 102. The storage controller and disk command queue 106 can act to store the commands in a queue and pass management commands to the storage management module 108 when management commands are encountered, while executing disk commands on the storage medium. Native Command Queuing (NCQ) can allow up to 32 commands to be queued within the storage controller and disk command queue.

When the disk command queue 106 is full, new data commands have nowhere to go. Therefore, they have to be rejected to allow subsequent commands (which may be management commands) to get to the target. Generally, this problem is known as a head of line blocking problem—if the data command at the head of the incoming stream were not rejected it would block subsequent management commands, preventing effective device management. UAS also imposes a requirement that the target device cannot stall commands, implying that the commands need to be processed, be that queued or rejected at the rate at which the host generates them.

Simply rejecting data commands as they arrive when the queue is full creates several issues. The target can be swamped with rejection processing at a time when it is busy with other tasks, and rejecting commands degrades performance as the host stack recovers for what could just be a temporary queue full state. These problems are compounded by the fact that UAS has no limits on the rate at which commands can be issued, nor a limit on the number of outstanding commands that can be issued.

What is needed is a solution that does not suffer from these issues.

SUMMARY OF THE INVENTION

In a first embodiment of the present invention, a method for processing an incoming command from a host at a bridge is provided, the incoming command destined for a target, the method comprising: determining if the incoming command is a data command or a management command; forwarding the incoming command to a storage management component of the target when the incoming command is a management command; when the incoming command is a data command: determining if a disk command queue on the target is full; sending the incoming command to the disk command queue when the disk command queue is not full; when the disk command queue is full: starting a timer, the timer having a predetermined length; sending the incoming command to the disk command queue when the disk command queue becomes not full prior to the expiration of the timer; and sending a rejection of the incoming command to the host only if, upon expiration of the timer, if the disk command queue is still full.

In a second embodiment of the present invention, a bridge coupled between a host and a target is provided, the bridge comprising: a command FIFO used to temporarily store incoming commands from the host; a timer; and a processor configured to: determine if the incoming command is a data command or a management command; forward the incoming command to a storage management component of the target when the incoming command is a management command; when the incoming command is a data command: determine if a disk command queue on the target is full; send the incoming command to the disk command queue when the disk command queue is not full; when the disk command queue is full: start a timer, the timer having a predetermined length; send the incoming command to the disk command queue when the disk command queue becomes not full prior to the expiration of the timer; and send a rejection of the incoming command to the host only if, upon expiration of the timer, if the disk command queue is still full.

In a third embodiment of the present invention, an apparatus for processing an incoming command from a host at a bridge, the incoming command destined for a target, the apparatus comprising: means for determining if the incoming command is a data command or a management command; means for forwarding the incoming command to a storage management component of the target when the incoming command is a management command; means for, when the incoming command is a data command: determining if a disk command queue on the target is full; sending the incoming command to the disk command queue when the disk command queue is not full; when the disk command queue is full: starting a timer, the timer having a predetermined length; sending the incoming command to the disk command queue when the disk command queue becomes not full prior to the expiration of the timer; and sending a rejection of the incoming command to the host only if, upon expiration of the timer, if the disk command queue is still full.

In a fourth embodiment of the present invention, a non-transitory program storage device readable by a machine tangibly embodying a program of instructions executable by the machine to perform a method for processing an incoming command from a host at a bridge, the incoming command destined for a target, the method comprising: determining if the incoming command is a data command or a management command; forwarding the incoming command to a storage management component of the target when the incoming command is a management command; when the incoming command is a data command: determining if a disk command queue on the target is full; sending the incoming command to the disk command queue when the disk command queue is not full; when the disk command queue is full: starting a timer, the timer having a predetermined length; sending the incoming command to the disk command queue when the disk command queue becomes not full prior to the expiration of the timer; and sending a rejection of the incoming command to the host only if, upon expiration of the timer, if the disk command queue is still full.

DETAILED DESCRIPTION OF SPECIFIC EMBODIMENTS

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

Figure 1:
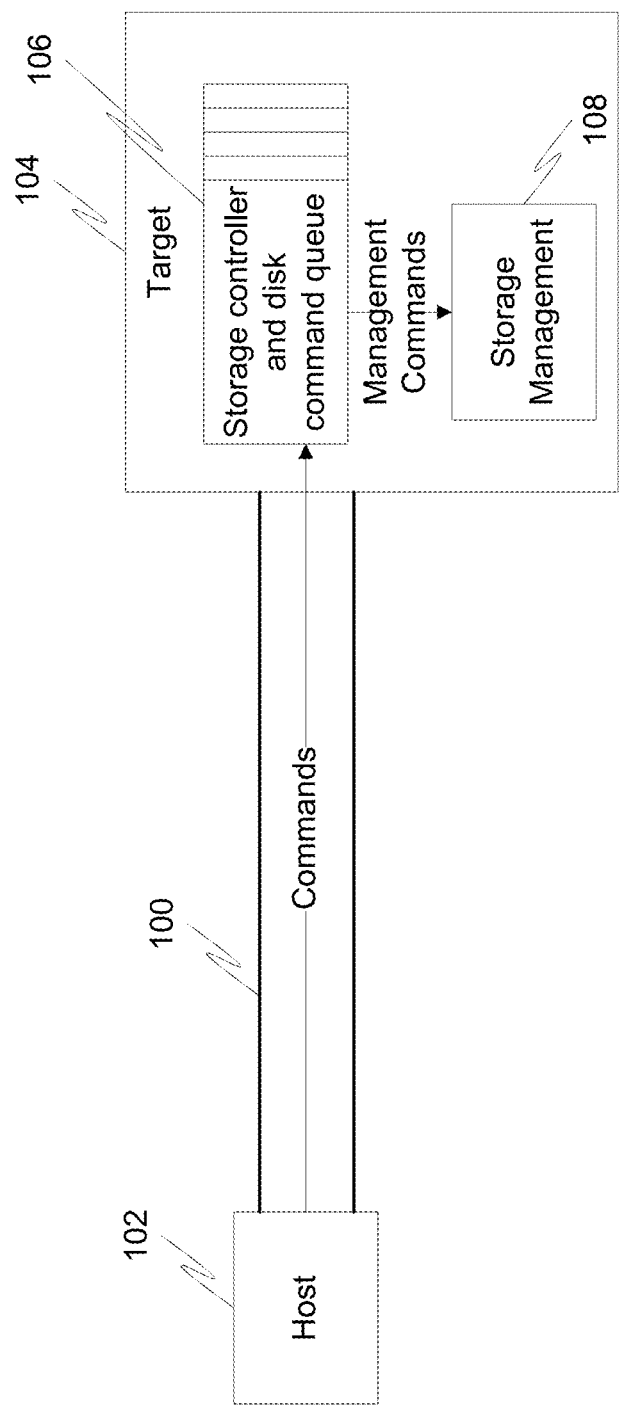
FIG. 1 is a diagram illustrating a standard UAS architecture.
Figure 2:
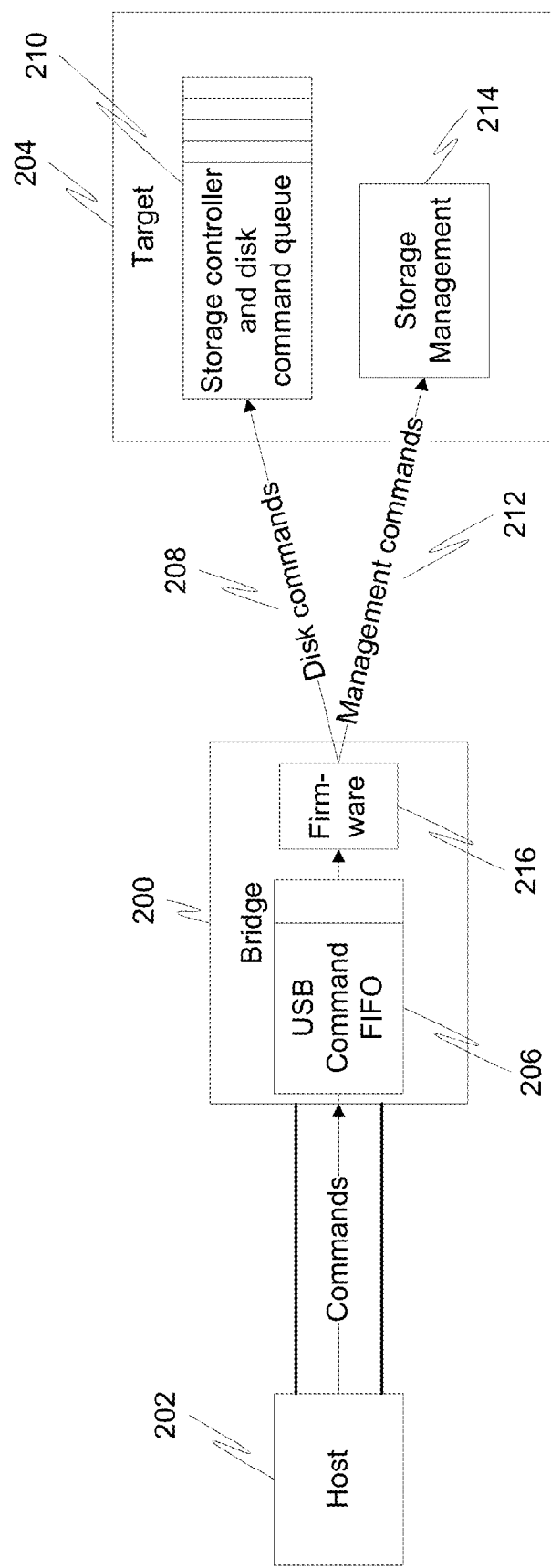
FIG. 2 is diagram illustrating one possible solution to the problems of the prior art.

FIG. 2 is diagram illustrating one possible solution to the problems of the prior art. Here, a bridge 200 is provided between the UAS driver host 202 and the target device 204. The bridge may include some level of flow control, such as a USB command FIFO queue 206, with firmware 216 taking commands from the FIFO and passing only disk commands 208 to storage controller and disk command queue 210 and only management commands 212 to storage management 214. The FIFO queue 206 only temporarily holds commands until it can be decided whether or not the queue on the storage controller and disk command queue is full. While management commands may be handled effectively using this technique, data commands may still be rejected when the queue on the storage controller and disk command queue is full. Each rejection of a data command adds overhead, as the UAS driver host must decide how to handle the rejection, and possibly resends the data command.

The present invention adds a timer to a bridge flow control mechanism to avoid the problems introduced by the solution presented in FIG. 2. The timer is specifically designed to begin running when a command is read from the FIFO and the storage controller and disk command queue indicates that its queue is full. Rather than immediately rejecting new data commands issued for the target device hosting that storage controller and disk command queue, the present invention holds the new command(s) while the timer is running. If, during this time, the command queue empties enough for the data command to be processed, the bridge flow control mechanism forwards the temporarily stored new data command(s) to the storage controller and disk command queue as usual. If the timer expires and the command queue is still full, then and only then is the UAS driver host informed and the command rejected.

One embodiment of the present invention is implemented on a USB to Serial Advanced Technology Attachment (SATA) bridge. However, one of ordinary skill in the art will recognize that the invention may be implemented on other types of bridges servicing devices using other types of protocols as well.

When a USB to SATA bridge is attached to a SATA storage device which supports NCQ, the storage device can typically queue 32 data commands. Thus, the issue arises in USB to SATA bridges when there are 33 or more pending, unprocessed data commands. In one sense, the present invention can be thought of as a way to handle the $33^{rd}$ data command in such systems.

By using a timer in the manner specified in this document, the performance impact of rejecting commands when the storage media was merely just a little slow to react to a given command is minimized or avoided entirely. Additionally the performance impact of rejecting commands when the UAS host software stack issues more commands than the queue can handle in quick succession is minimized or avoided entirely. Furthermore, firmware running on the USB to SATA bridge is not swamped by having to reject commands at unlimited frequency, ensuring that it has time to handle all the other ongoing tasks. Additionally, head of line blocking of incoming management tasks is avoided and a minimum service guarantee is provided.

The length set for the timer may vary based on implementation. In a preferred embodiment, the timer length is set a little less than the time it would take the host to reset itself and send a new data command upon receiving a rejection of a data command (due to a full queue), while still being longer than the worst-case target delay for processing a single data command. In another embodiment, the predetermined length is selected to provide a guaranteed number of data or management commands processed per second. In another embodiment, the predetermined length is selected to prevent overloading the bridge command processing function with command rejections.

The timer itself can also vary in implementation. In the simplest case, the timer may be set at a particular value and then counted down. Expiration of the timer in this case would be when the timer reaches zero. The decrementing of the timer may be based on actual time (such as milliseconds measured by a clock internal to the bridge) or may be based on processing cycles. Other embodiments of the timer are also possible. For example, the timer may count "up" from zero to the predetermined value and expire when the predetermined value is reached.

In one embodiment of the present invention, the timer length can be dynamically set at runtime. This may be accomplished by measuring the performance of the target and/or the host and using that information in setting the timer length. This may include, as with above, setting the timer length to be between the time it would take the host to reset itself and send a new data command upon receiving a rejection of a data command (due to a full queue), while still being longer than the worst-case target delay for processing a single data command.

Figure 3:
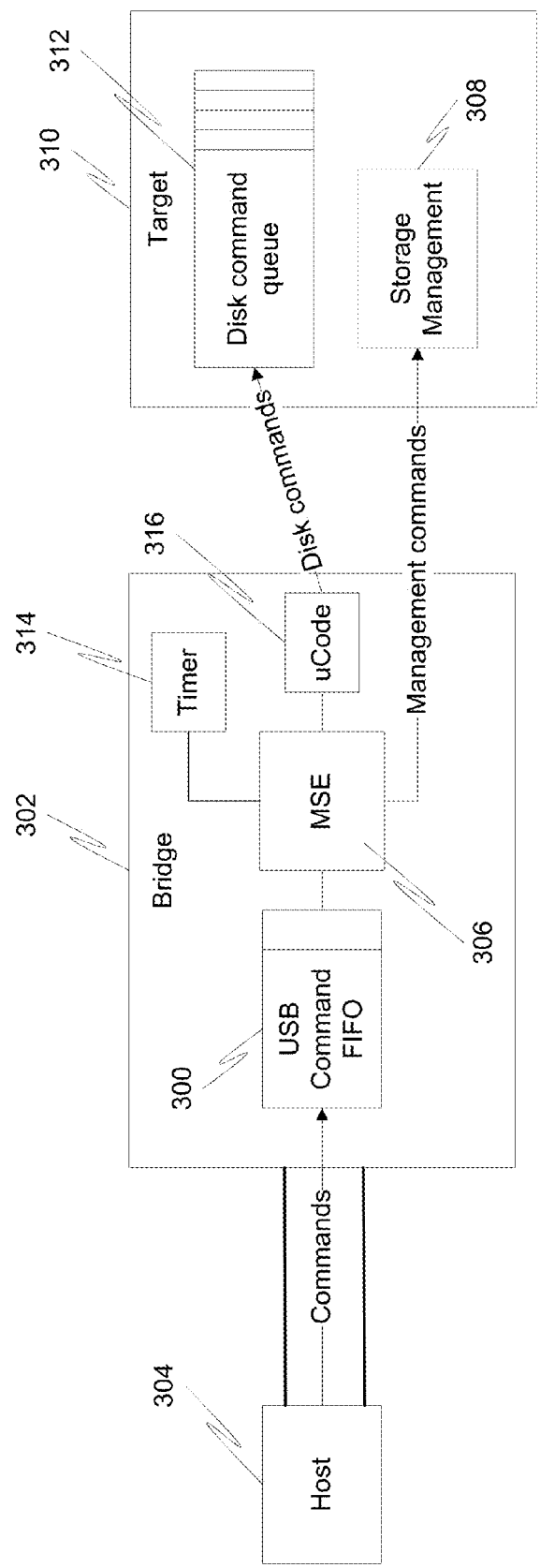
FIG. 3 is a block diagram illustrating a bridge in accordance with an embodiment of the present invention.

FIG. 3 is a block diagram illustrating a bridge in accordance with an embodiment of the present invention. A command FIFO 300 in the bridge 302 is used to store temporarily incoming commands coming from the host 304. A mass storage engine 306 then is able to determine if the incoming command is a data command or a management command. In the case of a management command, the mass storage engine 306 may forward the incoming command to a storage management component 308 of a target device 310. When the incoming command is a data command, the mass storage engine 306 may determine if a disk command queue 312 on the target device 310 is full. If not, the incoming command may be forwarded to the disk command queue 312 via a microcode engine 316. If so, then a timer 314 is started. If, while this timer 314 is running, the mass storage engine 306 determines that the disk command queue 312 is no longer full, the incoming command is forwarded to the disk command queue 312 via a microcode engine 316. A rejection is sent by the mass storage engine 306 to the host 304 indicating that the disk command queue 312 is full only if the timer 314 expires and the disk command queue 312 is still full.

Figure 4:
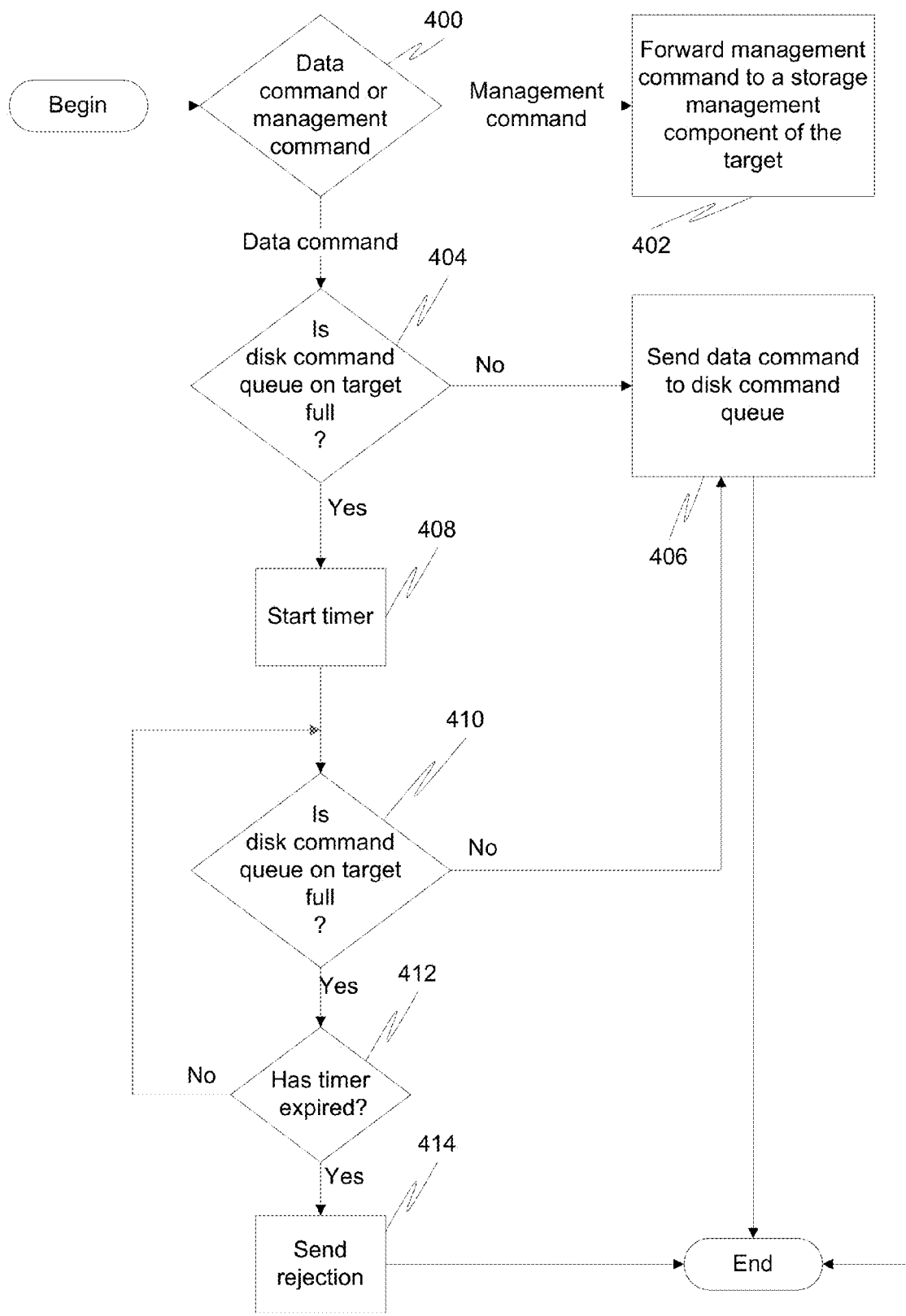
FIG. 4 is a flow diagram illustrating a method for processing an incoming command from a host at a bridge, the incoming command destined for a target.

FIG. 4 is a flow diagram illustrating a method for processing an incoming command from a host at a bridge, the incoming command destined for a target. At 400, it is determined if the incoming command is a data command or a management command. If it is a management command, then at 402 the incoming command is forwarded to a storage management component of the target. If it is a data command, then at 404, it is determined if a disk command queue on the target is full. If not, then at 406, the incoming command is sent to the disk command queue. If so, then at 408, a timer is started. While the timer is running, at 410, it is determined if a disk command queue on the target is full. If not, then at 406, the incoming command is sent to the disk command queue. At 412, it is determined if the timer has expired. If so, then a rejection of the incoming command is sent at 414. If not, the test is repeated at 410 to determine if a disk command queue on the target is full.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for processing an incoming command from a host at a bridge, the incoming command destined for a target, the target having a storage management component and a separately accessible disk command queue, the method comprising:

determining, at the bridge, if the incoming command is a data command or a management command;

processing management commands separately from data commands, including:

forwarding, by the bridge, the incoming command to the storage management component of the target when the incoming command is a management command; and when the incoming command is a data command, the bridge:

determining if the disk command queue on the target is full;

sending the incoming command to the disk command queue when the disk command queue is not full;

when the disk command queue is full, the bridge:

starting a timer, the timer having a predetermined length;

sending the incoming command to the disk command queue when the disk command queue becomes not full prior to the expiration of the timer; and sending a rejection of the incoming command to the host only if, upon expiration of the timer, if the disk command queue is still full;

wherein the predetermined length of the time is selected to reduce a performance penalty for the host to process rejections of incoming data commands when there is a temporary disk command queue full state.

2. The method of claim 1, wherein the predetermined length is less than it would take the host to reset itself and send a new data command upon receiving a rejection of a data command.

3. The method of claim 1, wherein the predetermined length is longer than a worst-case target delay for processing a single data command.

4. The method of claim 1, wherein the predetermined length is less than it would take the host to reset itself and send a new data command upon receiving a rejection of a data command and longer than a worst-case target delay for processing a single data command.

5. The method of claim 1, wherein the predetermined length is dynamically determined by measuring performance of the host and basing the predetermined length at least partially upon the measured performance.

6. The method of claim 1, wherein the predetermined length is dynamically determined by measuring performance of the target and basing the predetermined length at least partially upon the measured performance.

7. The method of claim 1, wherein the predetermined length is selected to provide a guaranteed number of data or management commands processed per second.

8. The method of claim 1, wherein the predetermined length is selected to prevent overloading the bridge command processing function with command rejections.

9. The method of claim 1, wherein the incoming command is stored temporarily in a command FIFO on the bridge.

10. The method of claim 1, wherein the host implements a USB Attached SCSI (UAS) protocol in which a target device cannot stall commands.

11. A bridge coupled between a host and a target, the target having a storage management component and a separately accessible disk command queue, the bridge comprising:
    a command FIFO used to temporarily store incoming commands from the host;
    a timer; and
    a processor configured to:
        determine if the incoming command is a data command or a management command;
        processing management commands separately from data commands, including:
            forward the incoming command to the storage management component of the target when the incoming command is a management command;
        when the incoming command is a data:
            determine if a disk command queue on the target is full;
            send the incoming command to the disk command queue when the disk command queue is not full;
        when the disk command queue is full:
            start a timer, the timer having a predetermined length;
            send the incoming command to the disk command queue when the disk command queue becomes not full prior to the expiration of the timer; and
            send a rejection of the incoming command to the host only if, upon expiration of the timer, if the disk command queue is still full;
                wherein the predetermined length of the time is selected to reduce a performance penalty for the host to process rejections of incoming data commands when there is a temporary disk command queue full state.

12. The bridge of claim 11, wherein the bridge is a USB to SATA bridge.

13. The bridge of claim 11, wherein the rejection indicates that the disk command queue on the target is full.

14. The bridge of claim 11, wherein the management command is a command that cannot be head of line blocked by a data command.

15. The bridge of claim 11, wherein the disk command queue has a limit of 32 commands.

16. The bridge of claim 11, wherein the host implements a USB Attached SCSI (UAS) protocol in which a target device cannot stall commands.

17. An apparatus for processing an incoming command from a host at a bridge, the incoming command destined for a target, the target having a storage management component and a separately accessible disk command queue, the apparatus comprising:
    means for determining if the incoming command is a data command or a management command;
    means for processing management commands separately than data commands, including:
        means for forwarding the incoming command to the storage management component of the target when the incoming command is a management command;
        means for, when the incoming command is a data command:
            determining if a disk command queue on the target is full;
            sending the incoming command to the disk command queue when the disk command queue is not full;
        when the disk command queue is full:
            starting a timer, the timer having a predetermined length;
            sending the incoming command to the disk command queue when the disk command queue becomes not full prior to the expiration of the timer; and
            sending a rejection of the incoming command to the host only if, upon expiration of the timer, if the disk command queue is still full;
                wherein the predetermined length of the time is selected to reduce a performance penalty for the host to process rejections of incoming data commands when there is a temporary disk command queue full state.

18. The apparatus of claim 17, wherein the host implements a USB Attached SCSI (UAS) protocol in which a target device cannot stall commands.

19. A non-transitory program storage device readable by a machine tangibly embodying a program of instructions executable by the machine to perform a method for processing an incoming command from a host at a bridge, the incoming command destined for a target, the method comprising:
    determining if the incoming command is a data command or a management command;
    processing management commands separately than data commands, including:
        forwarding the incoming command to a storage management component of the target when the incoming command is a management command;
        when the incoming command is a data command:
            determining if a disk command queue on the target is full;
            sending the incoming command to the disk command queue when the disk command queue is not full;
        when the disk command queue is full:
            starting a timer, the timer having a predetermined length;
            sending the incoming command to the disk command queue when the disk command queue becomes not full prior to the expiration of the timer; and
            sending a rejection of the incoming command to the host only if, upon expiration of the timer, if the disk command queue is still full;
                wherein the predetermined length of the time is selected to reduce a performance penalty for the host to process rejections of incoming data commands when there is a temporary disk command queue full state.

20. The non-transitory program storage device of claim 19, wherein the host implements a USB Attached SCSI (UAS) protocol in which a target device cannot stall commands.

* * * * *